United States Patent
Kobori

(10) Patent No.: US 8,452,943 B2
(45) Date of Patent: May 28, 2013

(54) APPARATUS AND METHOD FOR ADDRESS GENERATION FOR ARRAY PROCESSOR AND ARRAY PROCESSOR

(75) Inventor: Tomoyoshi Kobori, Minato-ku (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 12/746,468

(22) PCT Filed: Dec. 5, 2008

(86) PCT No.: PCT/JP2008/072155
§ 371 (c)(1),
(2), (4) Date: Jun. 4, 2010

(87) PCT Pub. No.: WO2009/072605
PCT Pub. Date: Jun. 11, 2009

(65) Prior Publication Data
US 2010/0306496 A1     Dec. 2, 2010

(30) Foreign Application Priority Data
Dec. 6, 2007 (JP) ................................. 2007-316099

(51) Int. Cl.
G06F 12/00 (2006.01)
(52) U.S. Cl.
USPC ................................. 711/220; 711/4; 711/200

(58) Field of Classification Search
USPC .............................................. 711/4, 200, 220
See application file for complete search history.

(56) References Cited

U.S. PATENT DOCUMENTS

| | | | | |
|---|---|---|---|---|
| 5,367,676 A | * | 11/1994 | Katori | 710/261 |
| 5,845,314 A | * | 12/1998 | Ishida | 711/104 |
| 5,867,723 A | * | 2/1999 | Chin et al. | 712/11 |
| 6,079,006 A | * | 6/2000 | Pickett | 711/213 |
| 2008/0059756 A1 | * | 3/2008 | Du et al. | 711/220 |
| 2009/0144522 A1 | * | 6/2009 | Vorbach et al. | 712/15 |

FOREIGN PATENT DOCUMENTS

| | | |
|---|---|---|
| JP | 3-80343 A | 4/1991 |
| JP | 2004-102633 A | 4/2004 |

OTHER PUBLICATIONS

Volker Strumpen et al., Stream Algorithms and Architecture, Jorunal of Insruction-Level Parallelism 6, 2004, pp. 31.

* cited by examiner

*Primary Examiner* — Hashem Farrokh
(74) *Attorney, Agent, or Firm* — Foley & Lardner LLP

(57) ABSTRACT

In address generation processors, the start and the end of the processing for address generation need to be controlled in addition to controlling the processing for base address generation. A timing control unit manages control for address conversion on a clock cycle basis. The difference between the processing speed in the address generation processors and the processing speed in the address conversion circuit is absorbed by buffers.

15 Claims, 8 Drawing Sheets

US 8,452,943 B2

APPARATUS AND METHOD FOR ADDRESS GENERATION FOR ARRAY PROCESSOR AND ARRAY PROCESSOR

REFERENCE TO RELATED APPLICATION

This application is the National Phase of PCT/JP2008/072155, filed May 11, 2009, which claims priority to Japanese Application No. 2007-316099, filed Dec. 6, 2007, the disclosures of which are hereby incorporated by reference in their entirety.

This application is based upon and claims the benefit of the priority of Japanese patent application No. 2007-316099 filed on Dec. 6, 2007, the disclosure of which is incorporated herein in its entirety by reference thereto.

The present application claims priority rights based on a Japanese Patent Application 2007-316099, filed on Dec. 6, 2007. The total disclosure of the patent application of the senior filing date is to be incorporated herein by reference.

TECHNICAL FIELD

This invention relates to a digital radio reception apparatus and, more particularly, to an array processor apparatus for receiving a signal transmitted by a frequency division multiplexing technique.

This invention also relates to an array processor and, more particularly, to a method and address generation apparatus for the array processor.

BACKGROUND ART

Among processor architectures which search after a high computation performance, there is an array processor. The array processor includes, as its typical configuration, a plurality of processing units (termed as PEs) arranged in an array and a plurality of memory banks peripherally arranged. The PEs arranged in an array execute computation in parallel as they receive data from neighboring units. The array processor has a high degree of parallel computation because the plurality of PEs execute the computation simultaneously. With the array processor, a high computational performance may be achieved in comparison with that achieved with the Neumann type architecture.

Since the plurality of memory banks access data simultaneously, it is possible to eliminate the bottleneck in memory accessing in the Neumann type architecture.

In addition, the array processor is able to access data in succession, and hence is suited for processing stream data. An example is DSA (Decoupled Systolic Architecture) proposed by Volker Strumpen et al. (see Non-Patent Document 1).

If, with the systolic array mentioned above, a high speed computation is to be achieved, memory access timing control at the clock cycle accuracy is required for accessing memories in synchronization with the timing of data which is propagated through PEs, in addition to the efficient memory accessing capability that allows for simultaneous accessing of a plurality of memory banks.

For example, Patent Document 1 discloses a configuration, shown herein in FIG. 6, as a computing system that is capable of reducing superfluous processing cycles to improve the memory accessing performance. Referring to FIG. 6, this processing system includes an address conversion circuit (apparatus) (ACNV) 22 in an address interconnection network (ACNCT) 21. The address conversion circuit (apparatus) operates for converting a base address Adr, generated by a processor (PRC) 24, and generates a bank selection signal sel. This bank selection signal sel is generated on the basis of a parameter which is based on the address obtained on conversion address and on the number of addresses of the memory bank. The address conversion circuit (apparatus) outputs the so generated bank selection signal sel to a data interconnection network (DCNCT) 25. This data interconnection network 25 selectively sets a data path between the processor 24 and memory banks 23a to 23f.

The memory banks 23a to 23f store data regarding computing operations. If an address space has 48 addresses of from adr0 to adr47, for example, the memory banks each have 8 addresses obtained on equal division by six of the number of the addresses.

A plurality of address generation apparatuses 20a to 20f generate addresses corresponding to memory addresses of the memory banks 23a to 23f to output the so generated addresses to the address interconnection network 21.

A plurality of computing apparatuses 26a to 26f execute computing on data transmitted thereto over the data interconnection network 25 to output the computing results to the data interconnection network 25.

The processor 24 generates a succession of addresses, for example, addresses Adr corresponding to the address space, and outputs the so generated addresses to the address interconnection network 21. The processor 24 inputs data read from a desired one of the memory banks over the data interconnection network 25 or inputs the results of computation by the processing units 26a to 26f to perform preset processing thereon. The processor also transmits preset data to the desired memory bank via the data interconnection network 25, or transmits desired data to the processing units 26a to 26f.

In the computing system of FIG. 6, the address interconnection network 21 allows for accessing the plurality of memory banks 23a to 23f simultaneously. The processing of address generation is taken charge of by the processor and by a dedicated hardware (HW) to improve the efficiency in the amount of computation for address generation.

Non-Patent Document 1:
Volker Strumpen and two others: 'Stream Algorithms and Architecture', Journal of Instruction-Level Parallelism 6, Sep. 4, 2004, pp. 1-31

Patent Document 1:
JP Patent Kokai Publication No. JP-P2004-102633A

SUMMARY

The disclosures of the Patent Document 1 and the Non-Patent Document 1 are incorporated herein by reference. The following analysis is made by the present invention.

In the configuration shown in Patent Document 1, if timing control on a clock cycle basis is to be performed, control of timing is performed within the processor 24. FIG. 7 illustrates the timing control for address generation by the processor within the computing system of FIG. 6. FIG. 8 illustrates address generation by the address conversion circuit 22 of FIG. 6. The processor 24 performs a processing sequence including generation of a base address (S101 of FIG. 7), timing acquisition (S102 of FIG. 7) and address outputting to an external unit (S104 of FIG. 7). The address conversion circuit (ACNV) 22, generating the address needed for memory accessing, inputs data from the processor 24 (S201 of FIG. 8) to perform the processing for address generation (S202).

Since the processor 24 has to execute the additional processing of timing control (steps S102 and S103 of FIG. 7), in addition to the processing of address generation, its program amount increases.

On the other hand, such a processor of high performance is needed which is not likely to fall into collapse as a result of carrying out those processing.

It is therefore an object of the present invention to provide a method and an address generation apparatus, and an array processor according to which, in generating an address for an array processor, memory accessing may be achieved efficiently with the use of the array processor of simplified configuration and with the use of a smaller amount of additional hardware. It is another object of the present invention to provide a method and an address generation apparatus, and an array processor according to which, in generating an address for the array processor, timing control may be carried out on a clock cycle basis.

The invention may be summarized substantially as follows, though not limited thereto:

According to the present invention, there is provided an address generation apparatus comprising:

a memory that stores data relevant to computation by an array computing device;

an address generation processor that generates a base address of the memory;

a buffer that temporarily stores the base address generated by the address generation processor;

an address conversion circuit that executes address computation on the base address generated by the address generation processor and stored in the buffer to generate a converted address; and a timing control unit that at least exercises timing control in executing address computation in the address conversion circuit.

According to the present invention, there is provided an address generation apparatus for an array processor, the apparatus being connected to a group of data storage means including a plurality of data storage means and to an array computing means that receives data from the group of data storage means to perform computation thereon, the apparatus comprising:

a base address generation means that generates a base address for an address issued to the data storage means;

a plurality of base address storage means that temporarily store the base address obtained from the base address generation means;

an address computing means that performs preset address computation on the base address obtained from the base address storage means;

an address transfer means that transfers the address obtained from the address computing means to the plurality of the data storage means; and a timing control means that controls the timing of execution of computation by the address computing means, wherein addresses are issued to the plurality of the data storage means, the base address generation means generates the base address at a timing of the base address generation means itself without dependency upon the data input/output timing requested by the array computing means, and the address computing means performs additional computation on the base addresses output from the plurality of the base address storage means based on a control signal supplied from the timing control means and supplying the addresses to the group of data storage means.

According to the present invention, the timing control means counts a clock signal to detect the address issuing timing. Alternatively, the timing control means detects the address issuing timing using a request signal output from the array computing means.

According to the present invention, the timing control means detects the address issuing timing by selecting one of
counting a clock signal and
using a request signal output from the array computing means,
the address issuing timing detected being applied to the processing of computing an address for read and an address for write.

According to the present invention, the address computing means performs the processing of adding an offset value specified in advance to a base address entered.

According to the present invention, there is provided an array processor comprising:

a group of data storage means including a plurality of data storage means;

an array computing means that receives data from the group of data storage means to perform computation thereon;

a plurality of base address generation means, each of which generates a base address for an address issued to the data storage means;

a plurality of base address storage means, each of which temporarily stores the base address obtained from the base address generation means;

an address computing means that performs preset address computation on the base address obtained from the base address storage means;

an address transfer means that transfers addresses obtained from the address computing means to the plurality of the data storage means; and a timing control means that controls the timing of computation performed by the address computing means, wherein the address is issued to the plurality of the data storage means, the base address generation means generates the base address at a timing of the base address generation means itself without dependency upon the data input/output timing requested by the array computing means, and the address computing means performs additional computation on the base address output from the plurality of the base address storage means by a control signal supplied from the timing control means and supplies the addresses to the group of data storage means.

According to the present invention, there is provided a method for address generation comprising the steps of:

generating a base address for a memory that stores data relevant to computation by an array computing device;

storing the base address generated in a buffer;

converting the base address stored in the buffer; and controlling a timing of execution of the conversion of the base address.

According to the present invention, efficient memory accessing may be achieved in an array processor, by a processor of simplified configuration and by a smaller amount of additional hardware. Moreover, according to the present invention, timing control may be managed on a clock cycle basis.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
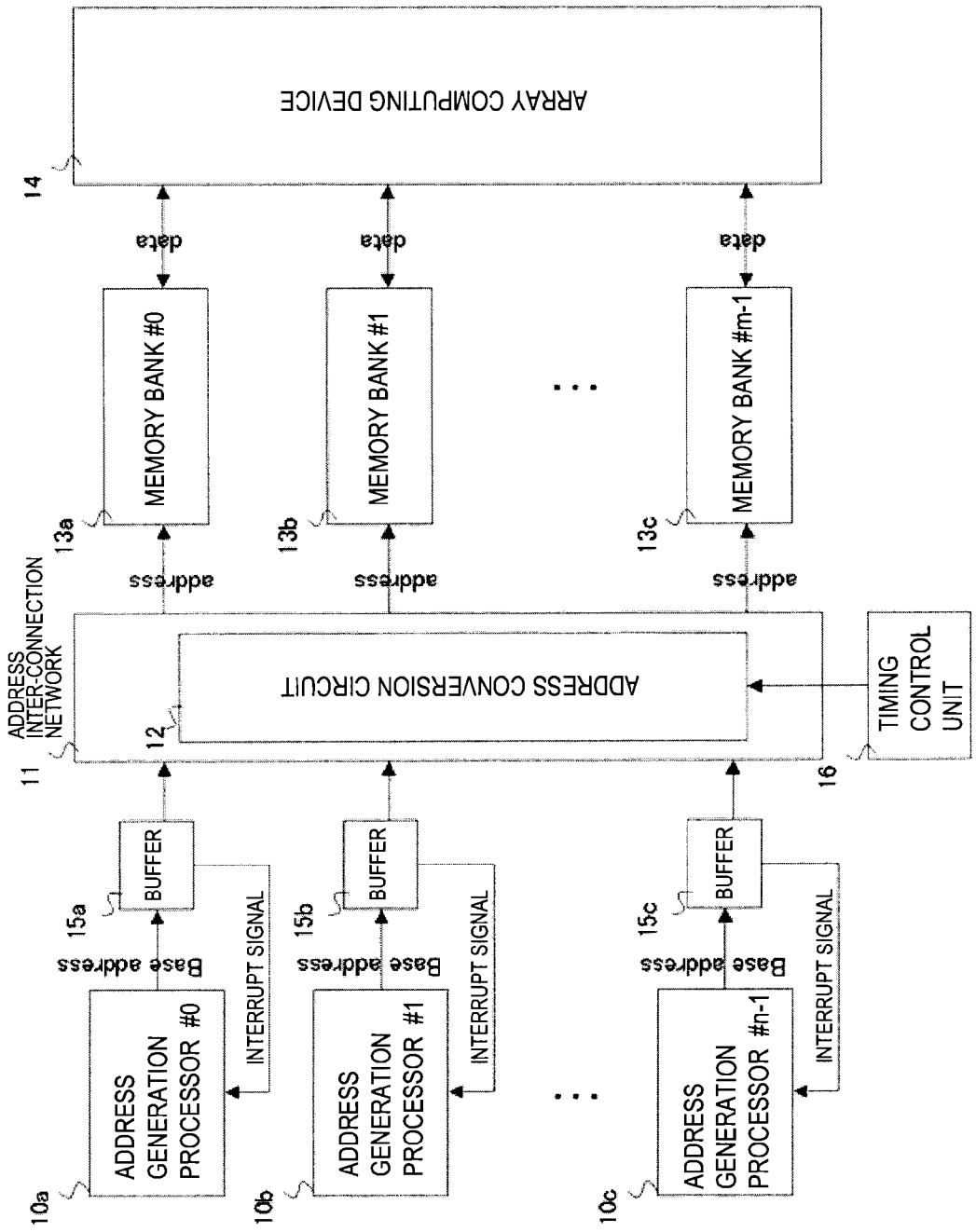
FIG. 1 is a diagram illustrating a configuration of an exemplary embodiment of the present invention.

To further elucidate the present invention, preferred modes will now be described with reference to the drawings. Referring to FIG. 1, an apparatus according to an exemplary embodiment of the present invention includes a plurality of address generation processors (base address generation means) (10a to 10c), each of which generates a base address for an address issued to each of a plurality of memory banks (data storage means), (13a to 13c);

a plurality of buffers (base address storage means) (15a to 15c) that temporarily store the base addresses obtained by the address generation processors (10a to 10c);

an address conversion circuit (address computing means) (12) that performs the processing of address conversion, such as offset addition, on the base address obtained from the buffers (15a to 15c);

an address interconnection network (address transfer means) (11) that transfers the address obtained from the address conversion circuit (12) to a plurality of data storage means; and a timing control unit (timing control means) (16) that controls the timing of computation performed on the address conversion circuit (12).

The address generation processors (10a to 10c) may perform solely the processing of notifying the start and the end of the processing for address generation in addition to the processing for base address generation.

The address generation is controlled by the timing control unit (16) on a clock cycle basis.

The difference between the processing speed by the address generation processors (10a to 10c) and that by the address conversion circuit (12) is absorbed by the buffers (15a to 15c).

In an exemplary embodiment of the present invention, the timing control unit (16) exercises accurate timing control at an accuracy on a clock cycle basis. It is thus only sufficient that the address generation processors (10a to 10c) notify the start and the end of processing and generate a base address.

In an exemplary embodiment of the present invention, it is unnecessary that the processing for control is carried out on the processor side, thus enabling the programming volume to be reduced.

Figure 7:
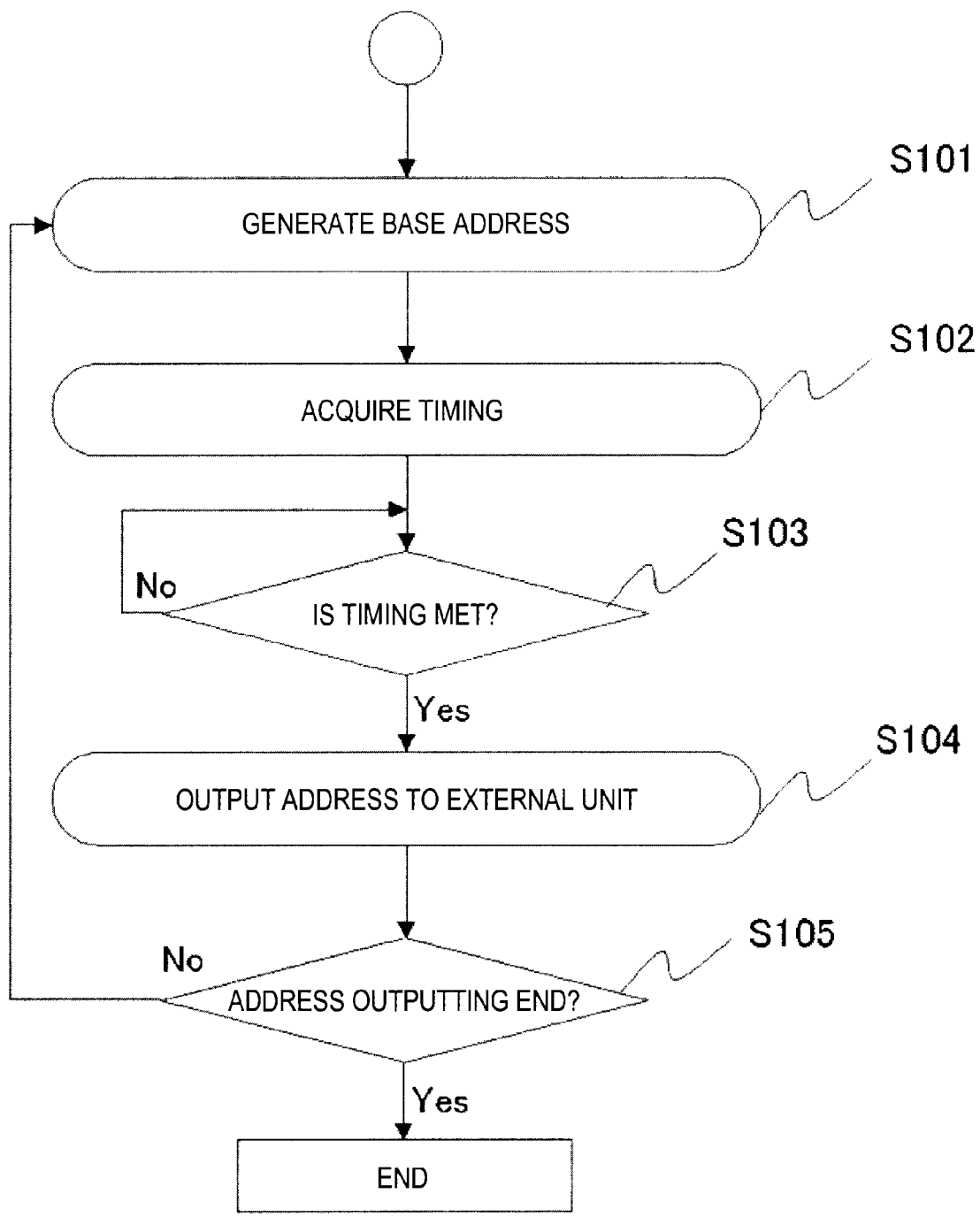
FIG. 7 is flowchart for illustrating the operation of an address generation processor of FIG. 6.
Figure 8:
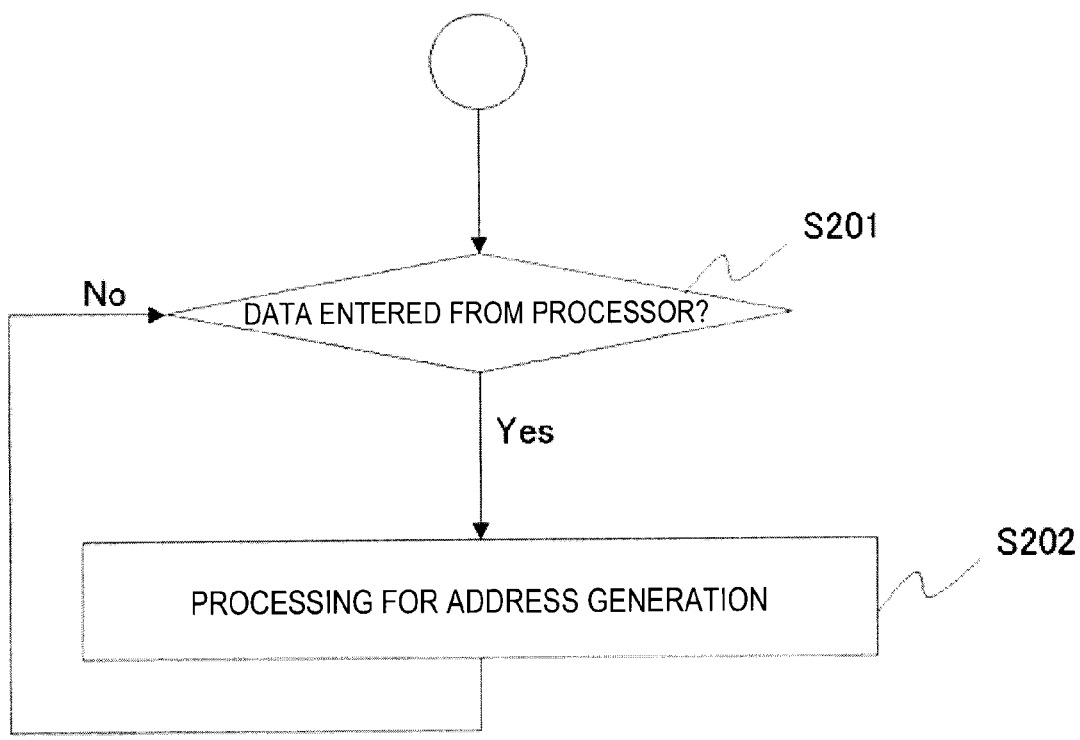
FIG. 8 is a flowchart for illustrating the operation of an address conversion circuit of FIG. 6.

In an exemplary embodiment of the present invention, a plurality of memory banks may be accessed simultaneously by an address connection network and an address conversion circuit (the address connection network and the address conversion apparatus in the configuration of Patent Document 1 explained with reference to FIGS. 6 to 8). In addition, timing control may be managed, on a clock cycle basis, using a processor of simplified configuration. Exemplary embodiments of the present invention will now be described in detail.

FIG. 1 shows a configuration of a first exemplary embodiment of the present invention. Referring to FIG. 1, data for computation are stored in each of a plurality of, herein an m-number of, memory banks 13a to 13c.

An array computing device 14 performs desired computation using data stored in the m-number of the memory banks 13a to 13c. It is noted that the array computing device 14 includes a plurality of, herein an m-number of computing apparatuses.

A plurality of, herein an n-number of, address generation processors 10a to 10c generates addresses (base addresses) corresponding to the memory addresses of memory banks.

A plurality of buffers 15a to 15c temporarily stores the base addresses respectively output from the address generation processors 10a to 10c.

An address interconnection network 11 transfers the data to desired ones of the memory banks 13a to 13c that receive the base addresses stored in the buffers 15a to 15c.

Using the base addresses, generated by the address generation processors 10a to 10c, an address conversion circuit 12 performs computation for address conversion, for example, offset addition or conversion to addresses for DFT. The address conversion circuit 12 performs the address computation, disclosed in Patent Document 1, to output converted addresses.

A timing control unit 16 controls the timing for computation and the address issuing timing in the address conversion circuit 12.

The operation of the first exemplary embodiment of the present invention will now be described with reference to FIGS. 1 to 4. The following description is focused on the operation from the generation of the base addresses in the address generation processors 10a to 10c until the addresses are issued to the memory banks 13a to 13c is described in distinction between the read operation and the write operation. As a premise for the explanation of the operation, it is supposed that the address conversion circuit 12 performs the processing for offset addition.

By the control of the timing control unit 16, the address is issued at a timing such that eight addresses are issued in each 16 clocks.

In the following explanation, it is presupposed that the base address for memory read is generated by the address generation processor 10a, and that the base address for memory write is generated by the address generation processor 10b.

Initially, the operation of the generation of the read address will be described.

First, the address generation processor 10a generates a base address for accessing a memory bank #0 (13a).

Figure 2:
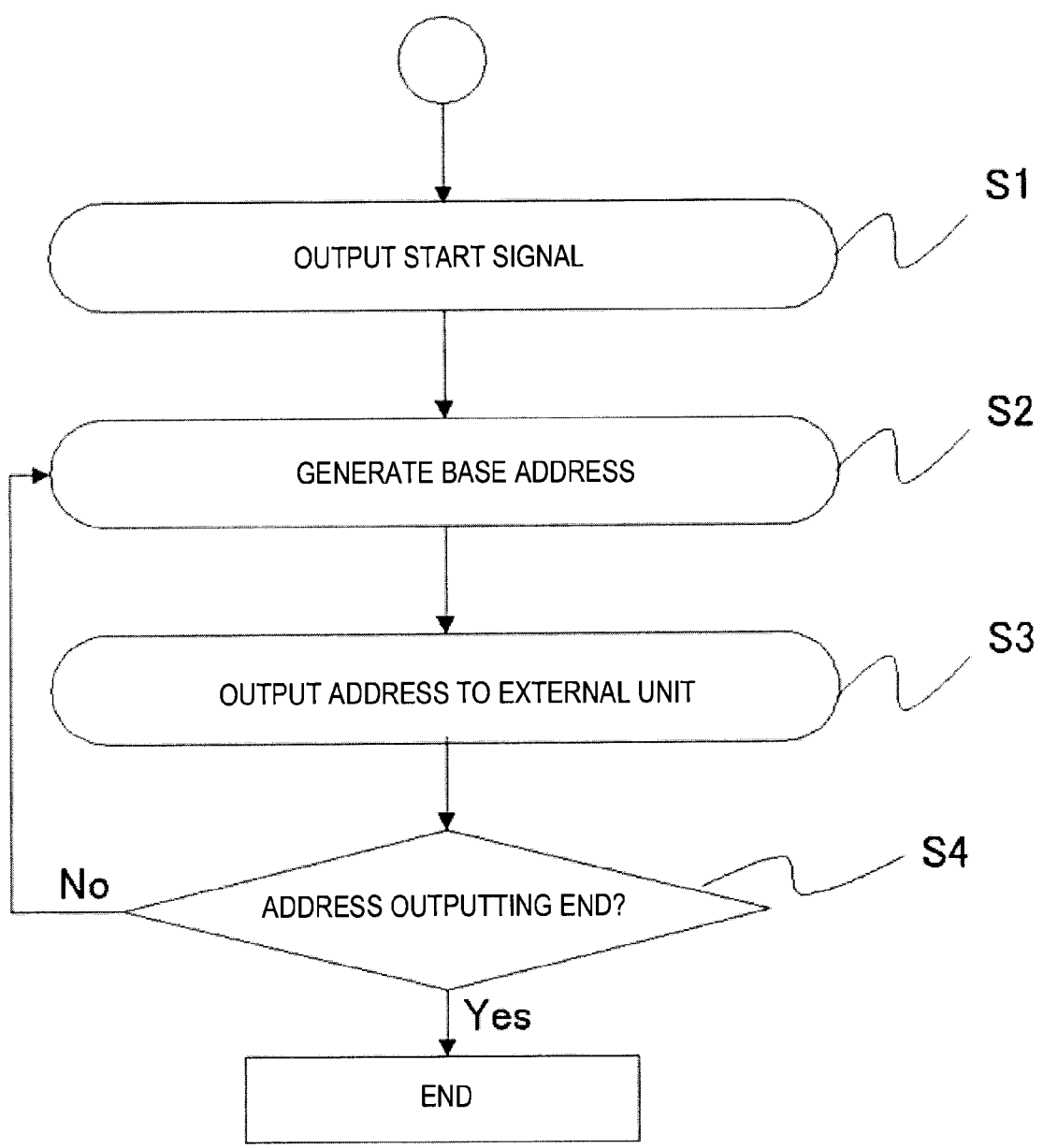
FIG. 2 is a flowchart for illustrating the operation of an address generation processor in the exemplary embodiment of the present invention.

FIG. 2 shows the processing flow in the address generation processor. The flow of the base address generation by the address generation processor 10a will now be described.

When the processing by the address generation processor 10a is initiated, a start signal will initially be issued (step S1).

A base address is generated by the address generation processor 10a (step S2).

The address generation processor 10a determines whether or not a preset number of the base addresses have been generated. If the preset number has not been reached, the step S2 of base address generation is reiterated. If the preset number has been reached, the processing is brought to a close.

In the present exemplary embodiment, timing management is not performed by the address generation processor 10a as long as the base addresses are being generated by the address generation processor 10a. Viz., the processing of steps corresponding to the steps S102 and S103 of FIG. 7 is not carried out in the address generation processor 10a. Hence, the base addresses may be delivered more expeditiously.

The addresses generated by the address generation processor 10a are stored in a buffer 15a.

Figure 3:
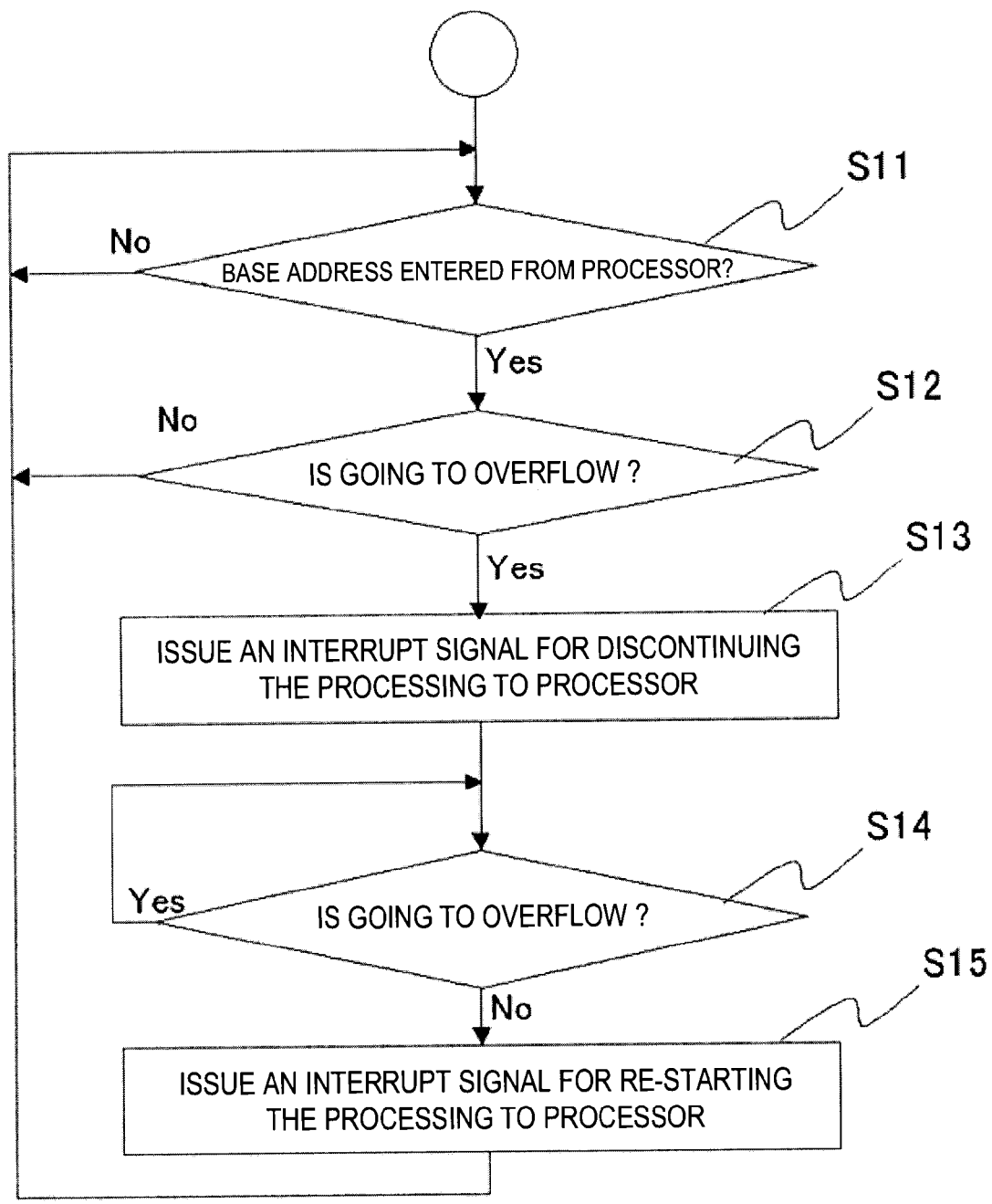
FIG. 3 is a flowchart for illustrating the operation of a buffer in the exemplary embodiment of the present invention.

FIG. 3 illustrates the processing by buffers 15a to 15c. The base addresses from the address generation processors 10a to 10c are entered to the buffers 15a to 15c, respectively. When at least one base address is stored in the buffer, the base address is transmitted, in response to the timing for address generation, controlled by the timing control unit 16, via the address interconnection network 11 to the address conversion circuit 12 from the buffer that has stored at least one base address (step S11).

It may sometimes occur that the processing of generation of the base addresses by the address generation processor 10a outruns the address issuing of the address conversion circuit 12 in timing. In such case, the buffer 15a may be going to overflow (YES of step S12). In this case, the buffer 15a issues an interrupt signal to the address generation processor 10a (step S13) to discontinue the operation of the address generation processor 10a.

If it is then concluded again that the buffer has an enough space capacity (NO of step S14), an interrupt signal is issued to the address generation processor 10a to instruct re-starting the processing for base address generation (step S15). The timing control unit 16 controls the address issuing timing by a counter operating based on a clock signal.

The address conversion circuit 12 adds an offset to the base address and issues the resulting address to the memory bank 13a at a preset timing.

Figure 4:
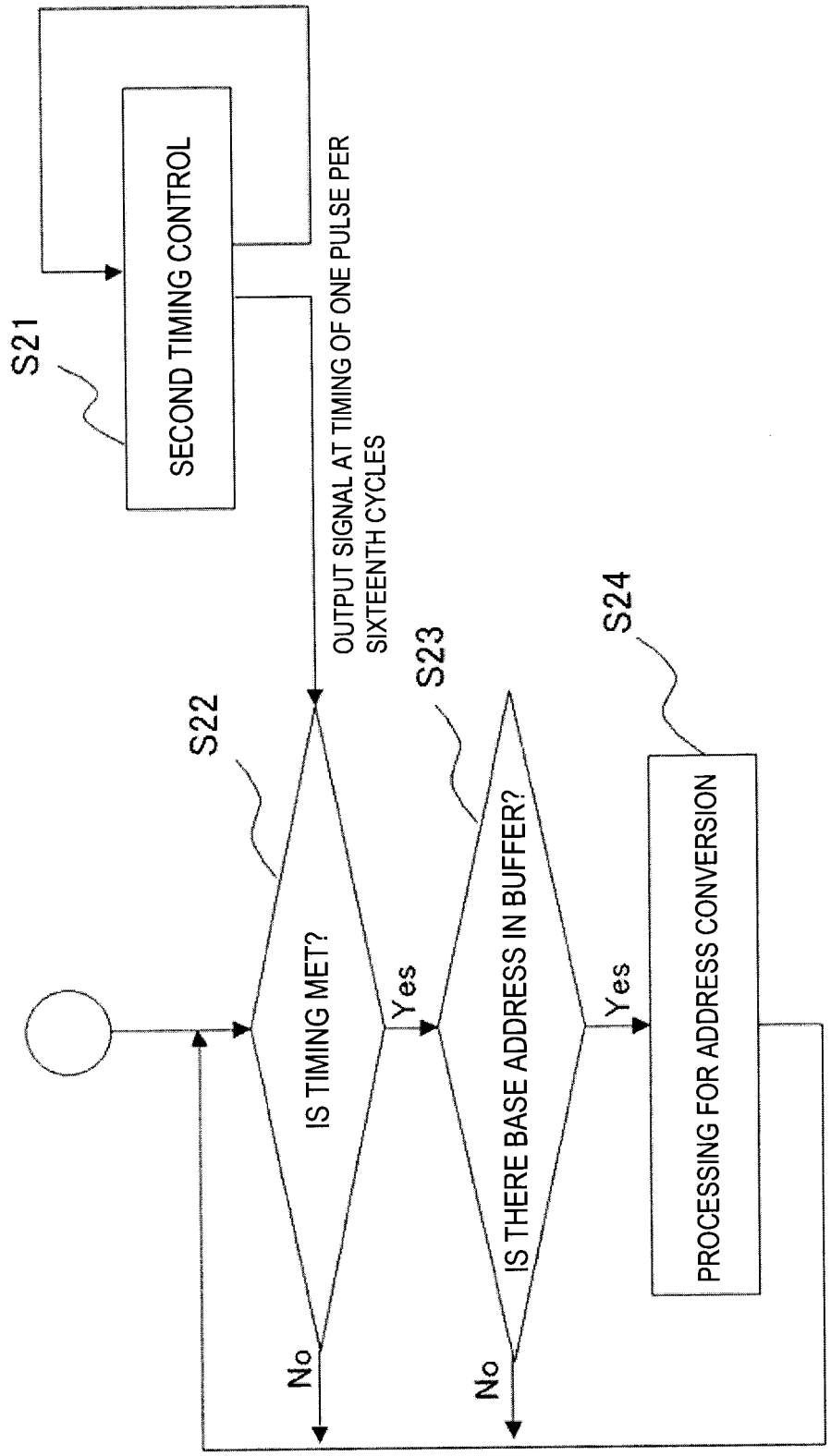
FIG. 4 is a diagram illustrating the operation of an address conversion circuit in the exemplary embodiment of the present invention.

FIG. 4 shows a flow of processing by the timing control unit 16 and the address conversion circuit 12.

When an address is issued to the memory bank 13a, data is supplied from the memory bank 13a to the array computing device 14 so that the processing of computation is performed thereon. The timing control unit 16 uses a clock signal to take timing synchronization for data read (steps S21 to S22). The second timing control (step S21) is timing control performed by the timing control unit 16. The timing control unit 16 thus outputs a timing signal at each preset cycle. In case the timing condition is met (YES of step S22), and there exists a base address in the buffer 15a (YES of step S23), the address conversion circuit 12 performs the computation for converting the base address, by way of address conversion, to generate an as-converted address (step S24). The operation of base address conversion is performed in succession a number of times as long as such operation is needed by the array computing device 14.

The operation of the write address generation in the present exemplary embodiment will now be described. It is assumed that the address generation processor 10a generates a base address for read, and that the address generation processor 10b generates a base address for write, as mentioned previously. The addresses for read are generated in succession. It is thus necessary for the address generation processor 10a to generate an address for read even when data is being output from the array computing device 14 to the memory bank, that is, even during data write.

Thus, the base address for write is generated by the other address generation processor 10b and is stored in the buffer 15b.

The timing control unit 16 uses a clock signal to take timing synchronization needed for data write in the same way as during data read.

Based on the timing obtained from the timing control unit 16, the base address is supplied from the buffer 15b via the address interconnection network 11 to the address conversion circuit 12. An offset is added to the input base address so that the as-converted address is issued to the memory bank 13a.

It is assumed that, in the present exemplary embodiment, two address generation processors are provided in addition to the above mentioned two processors 10a and 10b. The above mentioned address generation processor 10c of FIG. 1 is one of such additional address generation processors. It is noted that those additional address generation processors operate in the same way as the above mentioned two address generation processors 10a and 10b.

In this case, four base addresses generated by the address generation processors 10a, 10b, . . . and 10c are entered to the address interconnection network 11. An offset is added to each address by the address conversion circuit 12, and each as-converted address is output to each specified one of the memory banks 13a, . . . and 13c.

It is noted that, in the present exemplary embodiment, the timing constraint of outputting eight addresses per 16 clock cycles, or the constraint on the number of address generation processors, is only for simplifying the explanation and hence is not to be interpreted restrictively.

Figure 6:
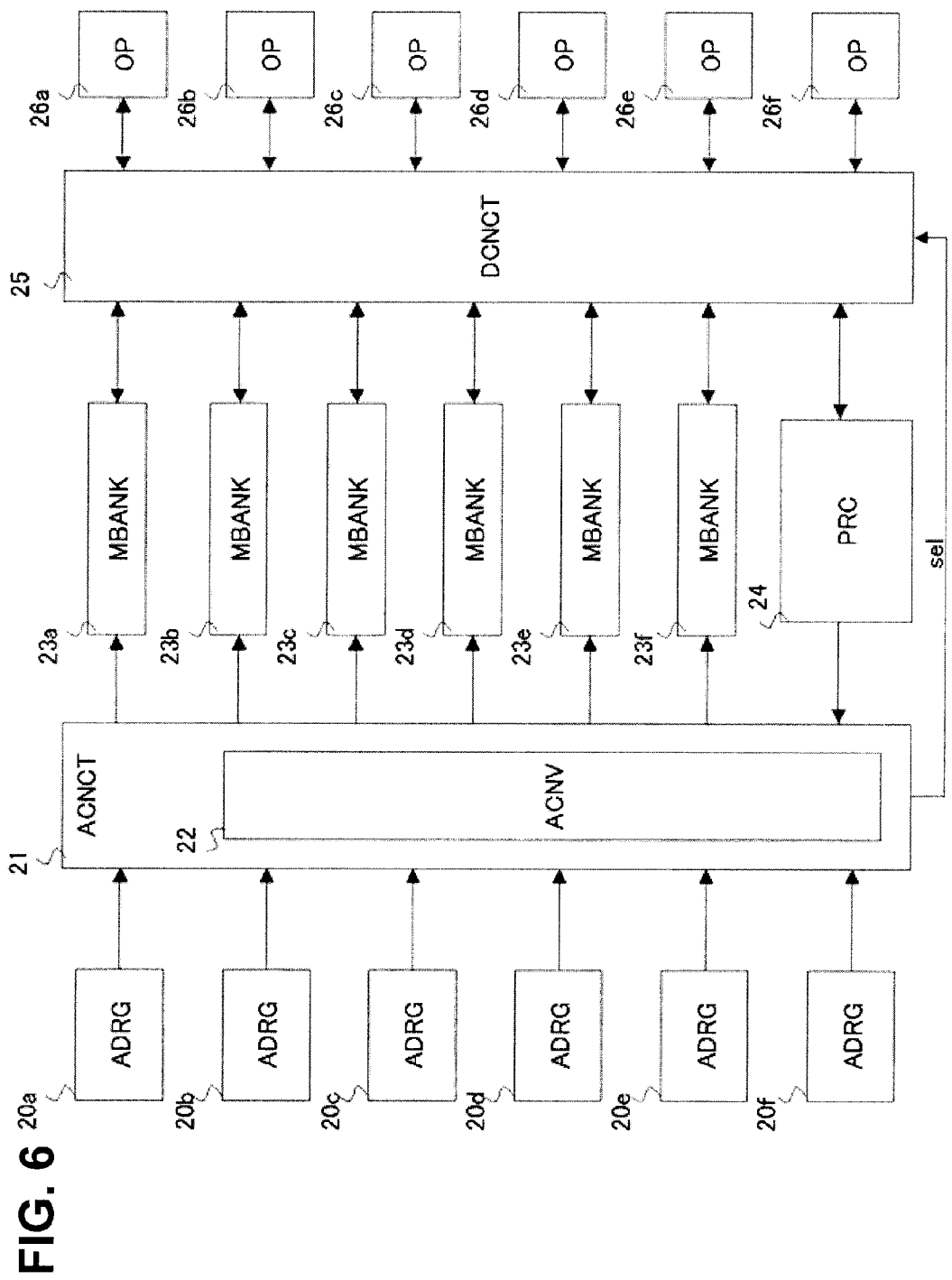
FIG. 6 is a diagram illustrating a configuration of a computing system disclosed in Patent Document 1.

In the configuration shown in FIG. 6, the address conversion circuit 22 of the address interconnection network 21 effectuates address conversion and generates a bank selection signal sel which is output to the data interconnection network 25. The data interconnection network (DCNCT) 25 selectively sets the data paths between the processor 24 and the memory banks based on the bank selection signal sel. In the present exemplary embodiment, the data interconnection network (DCNCT) of FIG. 6 is dispensed with. On the other hand, the address conversion circuit 12 does not generate the bank selection signal sel of FIG. 6.

Figure 5:
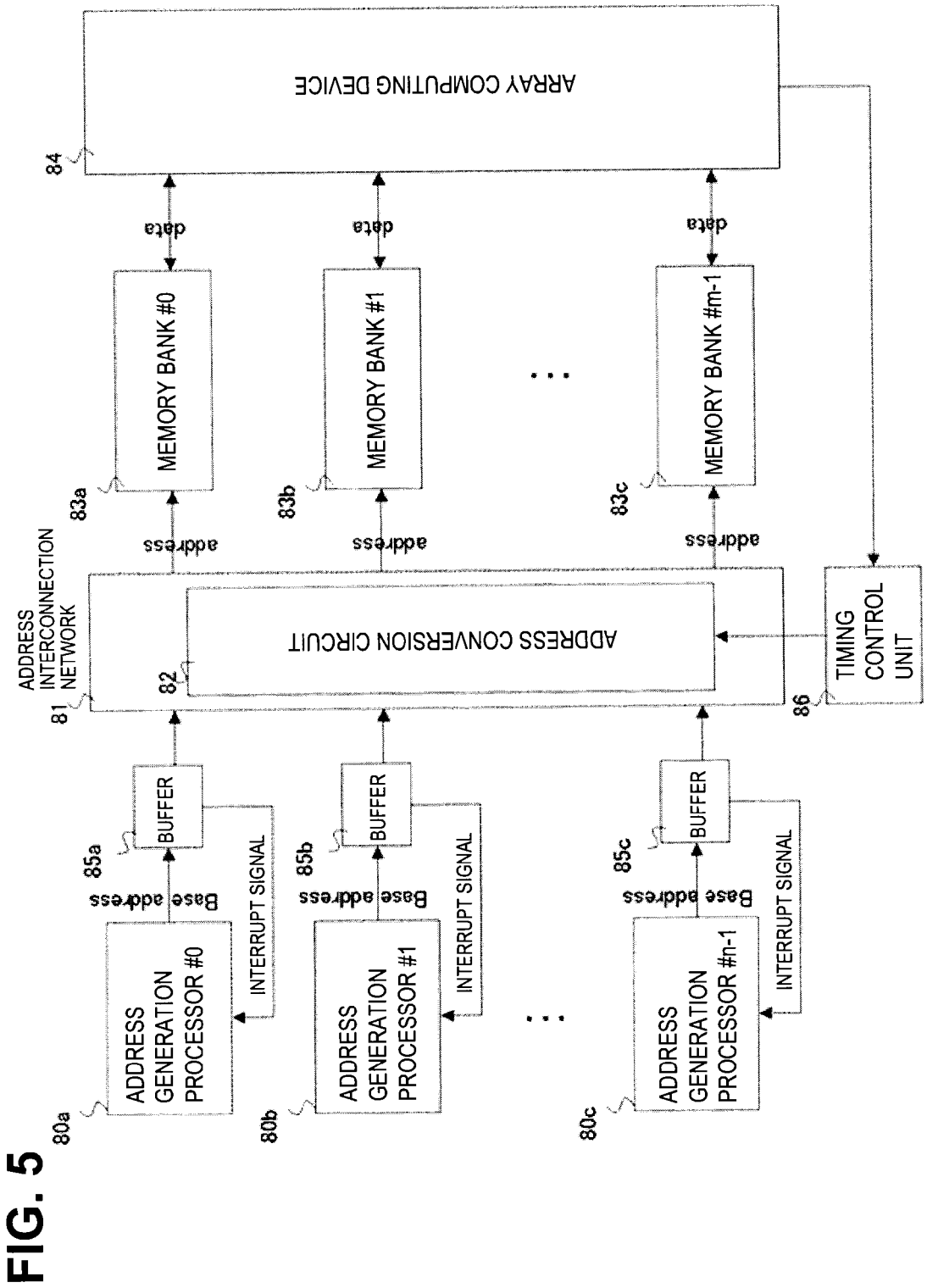
FIG. 5 is a diagram illustrating a configuration of another exemplary embodiment of the present invention.

A second exemplary embodiment of the present invention will now be described. FIG. 5 shows a configuration of the second exemplary embodiment of the present invention. Referring to FIG. 5, synchronization of the operation in a timing control unit 86 is by having reference to a request signal from an array computing device 84. It is noted that, in exemplary embodiment 1, described above, synchronization of the operation in the timing control unit is by having reference to a clock signal.

The operation of the present exemplary embodiment will now be described with reference to FIGS. 2 to 5. The following description is focused on the operation from the generation of the base address in the address generation processor 80a until the address is issued to the memory bank #0 (83a) in distinction between the read operation and the write operation. Before proceeding to the description of the operation, it is also supposed that the address conversion circuit 82 performs the processing for offset addition.

By the control of the timing control unit 86, the address is issued at a timing such that eight addresses are issued in each 16 clocks.

In the following, it is presupposed that the base address for memory read is generated by the address generation processor 80*a*, and that the base address for write is generated by the address generation processor 80*b*.

Initially, the operation of the generation of the read address will be described. First, the address generation processor 80*a* generates a base address for accessing a memory bank #0.

The flow for processing of a base address generation by the address generation processor 80*a* is as shown in FIG. 2. When the processing for the flow of generating a base address by the address generation processor 80*a* is started, a start signal is initially issued. A base address then is issued (step S2 of FIG. 2).

It is then checked whether or not a preset number of the base addresses has been generated. If the preset number has not been reached, the process of generating the base addresses is reiterated. If the preset number has been reached, the processing is brought to a close.

In the present exemplary embodiment, the address generation processor 80*a* does not manage timing control during base address generation. Hence, the base address can be output more speedily.

The address, generated by the address generation processor 80*a*, is stored in a buffer 85*a*.

The flow of the operations of the buffers 85*a* to 85*c* is similar to that of the previous exemplary embodiment, and is as shown in FIG. 3. If at least one base address is stored in the buffer, the base address is transmitted from the address buffer that has stored therein at least one base address, to an address conversion circuit 82, via an address interconnection network 81, in response to the timing of address generation which is controlled by the timing control unit 86.

It may sometimes occur that the processing of generation of the base addresses by the address generation processor 80*a* outruns the address issuing of the address conversion circuit 82, in timing, such that the overflow may be going to happen in the buffer 85*a*. In this case, the buffer 85*a* issues an interrupt signal to the address generation processor 80*a* to stop the operation of the address generation processor 80*a*.

If it is then concluded again that the buffer 85*a* has a sufficient capacity allowance, an interrupt signal is issued to the address generation processor 80*a* to instruct re-starting the processing for base address generation.

The timing control unit 86 controls the timing of address generation by a request signal from the array computing device 84.

The address conversion circuit 82 adds an offset to the address and issues the resulting address to a memory bank 83*a* at a preset timing.

The processing flow in the timing control unit 86 and in the address conversion circuit 82 is similar to that of the previous exemplary embodiment and is as shown in FIG. 4.

When the address has been issued to the memory bank 83*a*, data is furnished to the array computing device 84 to carry out the computation.

The address generation processor 80*a* generates as many base addresses in succession as are needed by the array computing device 84.

The operation of the generation of an address for write will now be described.

Addresses for read are generated in succession. It is thus necessary for the address generation processor 80*a* to generate addresses for read even during the time data is being output from the array computing device 84.

Hence, a distinct address generation processor 80*b* generates a base address which is then stored in a buffer 85*b*.

The timing control unit 86 uses a clock signal to take timing synchronization necessary for data write in the same way as during data read.

Based on the timing, obtained from the timing control unit 86, a base address is supplied via the address interconnection network 81 to the address conversion circuit 82. An offset is added to the input offset address so that an as-converted address is issued to the memory bank 83*a*.

It is assumed that, in the present exemplary embodiment, two address generation processors are provided in addition to the above mentioned two address generation processors 80*a*, 80*b*. A address generation processor 80*c* is one of such additional address generation processors.

It is noted that those additional address generation processors operate in the same way as the above mentioned two address generation processors 80*a*, 80*b*.

In this case, four base addresses generated by the respective address generation processors may be entered to the address interconnection network 81. An offset is added to each address by the address conversion circuit 82, and each as-converted address is output to the specified memory bank.

It is noted that, in the present exemplary embodiment, the timing constraint of outputting eight addresses per 16 clock cycles or the constraint on the number of address generation processors is only for simplifying the description and is not to be interpreted as being restrictive.

A third exemplary embodiment of the present invention will now be described. The present exemplary embodiment represents the combination of the above described exemplary embodiments 1 and 2. It is selected which of the control by a counter which counts the clocks (see FIG. 1) and the control by the request signal obtained from the array computing device (see FIG. 5) is to be used for taking timing synchronization in the timing control unit. Viz., the timing control unit includes a counter that counts the clocks, and inputs the request signal obtained by the array computing device. The timing control unit outputs a timing signal to the address conversion circuit based on one out of a clock count and the received request signal as selected under switch control. In other respects, the present exemplary embodiment is the same as the above described first or second exemplary embodiment. It is noted that the drawing for exemplary embodiment 3 is omitted for simplicity.

The present invention may be applied for a baseband processor for a radio communication apparatus in need of a plurality of computation of determinants or for an image processing apparatus that use many filter computation.

The particular exemplary embodiments or examples may be modified or adjusted within the gamut of the entire disclosure of the present invention, inclusive of claims, based on the fundamental technical concept of the invention. Further, a wide variety of combinations or selections of the elements disclosed herein may be made within the framework of the claims. That is, the present invention may comprehend larger numbers of modifications or corrections that may occur to those skilled in the art within the gamut of the entire disclosure of the present invention, inclusive of claims and the technical concept of the present invention.

The invention claimed is:

1. An address generation apparatus for an array processor, the apparatus being connected to a plurality of data storage units for storing data and to an array computing device that receives data from the plurality of data storage units to perform computation thereon, the apparatus comprising:
    a base address generation unit that generates a base address for an address issued to the data storage unit;
    a plurality of base address storage units that temporarily store the base address obtained from the base address generation unit;

an address computing unit that performs preset address computation on the base address stored in the base address storage unit;

an address transfer unit that transfers the address obtained from the address computing unit to an associated one of the data storage units; and a timing control unit that controls the timing of execution of the address computation by the address computing unit, wherein the timing control unit controls generation of the base address by the base address generation unit through control of one of the plurality of base address storage units, and wherein the base address storage unit issues an interrupt signal to the base address generation unit to discontinue generation of the base address when there is likelihood that the base address storage unit will overflow.

2. The address generation apparatus for an array processor according to claim 1, comprising
a plurality of the base address generation units in association with the plurality of the base address storage units,
the base address generation unit generating the base address at a timing of the base address generation unit itself, without dependency upon the data input/output timing requested by the array computing device,
the address computation unit performing additional computation on the base addresses output from the plurality of the base address storage units by a control signal supplied from the timing control unit and supplying the computed addresses to the plurality of the data storage units.

3. The address generation apparatus for an array processor according to claim 1, wherein the timing control unit counts a clock signal to detect the address issuing timing.

4. The address generation apparatus for an array processor according to claim 1, wherein the timing control unit uses a request signal output from the array computing device to detect the address issuing timing.

5. The address generation apparatus for an array processor according to claim 1, wherein the timing control unit detects the address issuing timing by selecting one of counting a clock signal; and
using a request signal output from the array computing device,
the address issuing timing detected being applied to the processing of
computing an address for read and an address for write.

6. The address generation apparatus for an array processor according to claim 1, wherein the address computation unit performs the processing of adding an offset value specified at the outset in a base address entered.

7. The address generation apparatus for an array processor according to claim 1, wherein the timing control unit controls the timing of execution of the address computation on a clock cycle basis.

8. An array processor comprising:
the plurality of data storage units;
the array computing device; and
the address generation apparatus for the array processor according to claim 1.

9. A method for address generation for an array processor, the array processor including a plurality of data storage units and an array computing device that receives data from the plurality of the data storage units to execute computation thereon, the method comprising:
generating a base address for an address issued to a data storage unit;
temporarily storing the base address in a base address storage unit;
an address computation unit executing preset address computation on the base address stored in the base address storage unit;
transferring an address resulting from the address computation to an associated one of the data storage units; and
a timing control unit controlling the timing of execution of the address computation by the address computation unit,
wherein the timing control unit controls generation of the base address through control of the base address storage unit, and
wherein the base address storage unit issues an interrupt signal to discontinue generation of the base address when there is a likelihood that the base address storage unit will overflow.

10. The method according to claim 9, comprising:
generating the base address at an own timing without dependency upon the data input/output timing requested by the array computing device;
the address computation unit performing additional computation, by a control signal supplied from the timing control unit, on the base addresses output from the plurality of base address storage unit and supplying the addresses to the plurality of data storage unit.

11. The method according to claim 9, comprising
the timing control unit counting a clock signal to detect the address issuing timing.

12. The method according to claim 9, comprising
the timing control unit using a request signal output from the array computing unit to detect the address issuing timing.

13. The method according to claim 9, comprising
the timing control unit detecting the address issuing timing by selecting one of counting a clock signal; and
using a request signal output from the array computing device,
the address issuing timing detected being applied to the processing of computing an address for read and an address for write.

14. The method according to claim 9, comprising
the address computation unit performing the processing of adding an offset value specified in advance in a base address entered.

15. The method according to claim 9, comprising
the timing control unit controlling the timing of execution of the address computation on the base address on a clock cycle basis.

* * * * *